Jan. 6, 1942.   W. L. McGRATH   2,268,761
ZONE TEMPERATURE CONTROL SYSTEM
Filed July 11, 1938   4 Sheets-Sheet 1

Inventor
William L. McGrath
By George H. Fisher
Attorney

Jan. 6, 1942.  W. L. McGRATH  2,268,761
ZONE TEMPERATURE CONTROL SYSTEM
Filed July 11, 1938  4 Sheets-Sheet 4

Inventor
William L. McGrath
By
George H Fisher
Attorney

Patented Jan. 6, 1942

2,268,761

UNITED STATES PATENT OFFICE 2,268,761

ZONE TEMPERATURE CONTROL SYSTEM

William L. McGrath, St. Paul, Minn., assignor to Minneapolis-Honeywell Regulator Company, Minneapolis, Minn., a corporation of Delaware Application July 11, 1938, Serial No. 218,578

17 Claims. (Cl. 236—46)

This invention relates to temperature control systems for buildings and particularly for buildings which are divided up into zones for conditioning the same.

It has long been the practice to divide a building into zones, to provide each zone with a valve means or equivalent for controlling the delivery of temperature changing fluid to that zone, and to provide each zone with a temperature controller for controlling the valve means of that zone to maintain desired temperature conditions in each zone of the building. In such arrangements, the temperature changing fluid delivered to the various zones is usually obtained from a common source, such as a boiler, district steam supply or the like. It is found that quite often more than one temperature controller will call for a temperature change at a time, and upon doing so the temperature controllers open their valve means at substantially the same time thereby increasing greatly the demand for temperature changing fluid. Likewise, more than one temperature controller may become satisfied at a time to close off their associated valve means to decrease greatly the demand for temperature changing fluid. This simultaneous opening and closing of the valve means causes the demand for temperature changing fluid to fluctuate widely. If a boiler is utilized as the source of temperature changing fluid, its efficiency of operation is greatly reduced by these wide fluctuations in demand are extremely wide, alternate "popping" of the boiler and extreme low pressures are likely to occur. If a district steam supply is utilized as the source of temperature changing fluid, these wide fluctuations in demand would increase greatly the cost of operation inasmuch as the cost of district steam varies with fluctuations in demand.

Accordingly, it is an object of this invention to provide a timing arrangement in combination with a zone temperature control system to prevent the above difficulty by staggering the opening and closing movements of the valve means of the various zones.

More specifically, it is an object of this invention to provide a zone control system wherein a temperature controller associated with each zone operates a valve means for controlling the supply of temperature changing fluid to its zone and wherein timing means are provided for staggering the opening and closing movements of the valve means to maintain desired temperatures within each zone while maintaining the demand for temperature changing fluid substantially constant.

The particular methods in which this sequence of operation is carried out also form objects of this invention.

For a more thorough understanding of this invention, reference is made to the accompanying drawings, in which Figure 1 discloses one form of this invention;

Figure 2 sets forth a modified form for accomplishing substantially the same results as are accomplished in Figure 1;

The control systems set forth in this application may be applied to a building having a plurality of zones the temperatures of which are to be maintained at desired values. A common source of temperature changing fluid, such as a boiler, may be utilized for supplying temperature changing fluid to the various zones.

Figure 1:
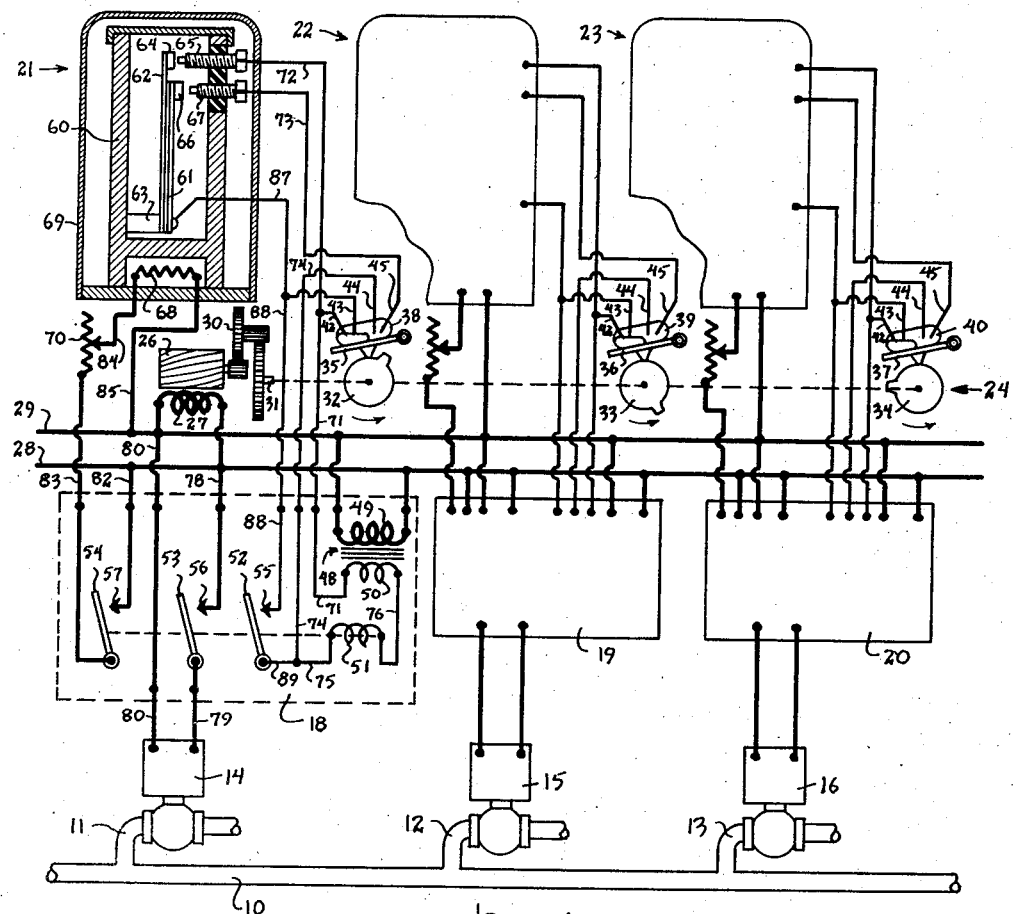

In Figure 1, a header leading from some source of temperature changing fluid, such as a boiler, not shown, or a district steam supply, is designated at 10. From this header 10 extend risers 11, 12, and 13 leading to three zones of the building. These risers supply temperature changing fluid, which may be in the form of steam at a desired pressure, to heat exchangers located in the various zones. The flow of temperature changing fluid through the risers 11, 12, and 13 is controlled by motorized zone valves 14, 15, and 16, respectively. When electric energy is supplied to these valves, they are opened to supply steam to their respective zones, and when the supply of electric energy is interrupted these valves close to stop the supply of steam to their respective zones.

Valves 14, 15, and 16 are controlled by relays 18, 19, and 20, respectively, which in turn are controlled by zone temperature responsive controllers 21, 22, and 23, respectively. A timer generally designated at 24 operates in conjunction with the zone temperature responsive controllers for controlling the operation of the relays 18, 19, and 20 to stagger the opening movements and the closing movements of the zone valves 14, 15, and 16.

The timer 24 may comprise a rotor 26 influenced by a field winding 27 connected across line wires 28 and 29 leading from some source of power, not shown. Rotor 26 operates a shaft 31 through a reduction gear train 30. The shaft 31 carries cams 32, 33, and 34, the high dwells of these cams being spaced equi-distant with respect to each other. The cams 32, 33, and 34 operate pivoted levers 35, 36, and 37 which in turn operate mercury switches 38, 39, and 40, respectively. The switches 38, 39, and 40 contain electrodes 42, 43, 44, and 45. With the switches in the positions shown in Figure 1, the electrodes 42 and 43 are bridged, and when the high dwells of the cams operate the switches to the position opposite to that shown in Figure 1 the electrodes 44 and 45 are bridged. For purposes of illustration it is assumed that the shaft 31 and hence the cams 32, 33, and 34 are rotated once every nine minutes. Hence every switch is operated every nine minutes and the operation of the switches 38, 39, and 40 are spaced three minutes apart.

Relay 18 may include a step-down transformer 48 having a primary 49 connected across line wires 28 and 29 and a secondary 50. This transformer is utilized for supplying power to the control circuit. The relay 18 also includes an operating coil 51 for operating switch arms 52, 53, and 54 with respect to contacts 55, 56, and 57. The arrangement is such that when the operating coil 51 is energized the switch arms are moved into engagement with their respective contacts, and when the operating coil is deenergized the switch arms are moved out of engagement with their respective contacts by means of springs, gravity, or other means, not shown. Relays 19 and 20 have exactly the same construction as the relay 18 and therefore a further description of these relays is not necessary.

For purposes of illustration, the temperature responsive controllers 21, 22, and 23 are shown to be of the outdoor temperature type disclosed in Patent 2,065,835 granted to D. G. Taylor on December 29, 1936. These controllers are located outside of the building adjacent to the zones which they are to control so that they will be affected by the same atmospheric conditions as affect their respective zones.

The outdoor controller 21 may comprise a metallic block 60 which is suitably hollowed out to receive a bimetallic element 61 and a spring arm 62 carried by a post 63. The spring arm 62 normally engages the bimetallic element 61 as shown in Figure 1. The spring arm 62 carries a contact 64 which is adapted to engage an adjustable stationary contact 65 and the thermostatic element 61 carries a contact 66 adapted to engage an adjustable stationary contact 67. An electric heater 68 heats the metallic block 60 for maintaining the block at desired temperatures. The structure of the temperature controller thus far described is housed in a suitable enclosure 69 to protect the same from the elements. For purposes of illustration, it is assumed that the stationary contacts 65 and 67 are so adjusted that upon a decrease in temperature of the block 60 the contact 64 first engages the contact 65 at 70°, and then contact 66 engages the contact 67 at 66°. Upon an increase in temperature, the contact 66 first disengages the contact 67 at 66° and then contact 64 disengages contact 65 at 70°. An adjustable rheostat 70 located in series with the heater element 68 is utilized for the purpose of adjusting the heating effect thereof. As is set forth in the above referred to Taylor patent, the rheostat 70 is adjusted so that the supply of heat to the outdoor controller and the supply of heat to the zone of the building controlled thereby is proportional to the heat loss from the temperature responsive controller and the heat loss from that zone of the building.

Assume now that the temperature of the outdoor controller decreases to 66° whereupon contacts 64 and 65 and contacts 66 and 67 are in engagement. When the cam 32 rotates to a position to operate the switch 38 to bridge the electrodes 44 and 45, a starting circuit for the operating coil 51 of the relay is completed. This starting circuit may be traced from the secondary 50 of the transformer 48 through wires 71 and 72, contacts 65, 64, 66, and 67, wire 73, electrodes 45 and 44 of the switch 38, wires 74 and 75, operating coil 51, and wire 76 back to the transformer 50. Completion of this circuit energizes the operating coil 51 to move the switch arms 52, 53, and 54 into engagement with their respective contacts 55, 56, and 57.

Movement of the switch arm 53 into engagement with the contact 56 completes a circuit from the line wire 28 through wire 78, contact 56, switch arm 53, wire 79, motorized valve 14, and wire 80 back to the other line wire 29. Hence when the relay 18 is pulled in, the motorized valve 14 is opened to supply steam to its associated zone.

Movement of the switch arm 54 into engagement with the contact 57 completes a circuit from the line wire 28 through wire 82, contact 57, switch arm 54, wire 83, adjustable rheostat 70, wire 84, heater element 68, and wire 85 back to the other line wire 29. Accordingly, when the relay 18 is energized, the heating element 68 of the outdoor controller is energized to supply heat to the same.

Movement of the switch arm 52 into engagement with the contact 55 completes a maintaining circuit for the operating coil 51 which is independent of the contacts 66 and 67. This maintaining circuit may be traced from the secondary 50 through wires 71 and 72, contacts 65 and 64, spring arm 62, and bimetallic element 61, wires 87 and 88, contact 55, switch arm 52, wires 89 and 75, operating coil 51, and wire 76 back to the secondary 50. Completion of this maintaining circuit maintains the relay 18 energized until such time as the temperature of the outdoor controller 21 rises to 70° to separate the contacts 64 and 65.

It is here noted that the electrodes 44 and 45 are included in the starting circuit of the relay 18 so that it is possible to pull in the relay 18 only at predetermined time intervals. After the relay has once been pulled in in the manner outlined above, it remains in at least until the temperature responsive controller 21 is satisfied. Since the cams 32, 33, and 34 are spaced apart in operation, it is therefore possible to open the various zone valves 14, 15, and 16 only at predetermined intervals. Accordingly, large fluctuations in demand for steam caused by simultaneous opening of a plurality of valves is entirely eliminated while substantially constant temperatures are maintained in each zone.

When the switch 38 is in the position shown in Figure 1, the electrodes 42 and 43 are bridged to complete a second maintaining circuit for the operating coil 51, this second maintaining circuit being traced from the secondary 50 through wire 71, electrodes 42 and 43, wire 88, contact 55, switch arm 52, wires 89 and 75, operating coil 51, and wire 76 back to the secondary 50. Hence after the relay has been pulled in in the manner specified above, the relay 18 will remain in until the electrodes 42 and 43 are unbridged. Electrodes 42 and 43 of the switches 38, 39, and 40 are unbridged in sequence and therefore it is only possible to close the zone valves 14, 15, and 16 at predetermined time intervals which prevents large fluctuations in the demand for steam caused by simultaneous closing of a plurality of zone valves.

Summarizing briefly the operation of Figure 1, it is seen that the zone valves can only be opened at predetermined time intervals providing their temperature responsive controllers are calling for a temperature change, and that the zone valves can be closed only at predetermined time intervals providing their respective temperature responsive controllers are satisfied. Accordingly, large fluctuations in the demand for temperature changing fluid caused by simultaneous opening or closing of zone valves is eliminated and desired temperature conditions are at all times maintained in each zone.

Figure 2:
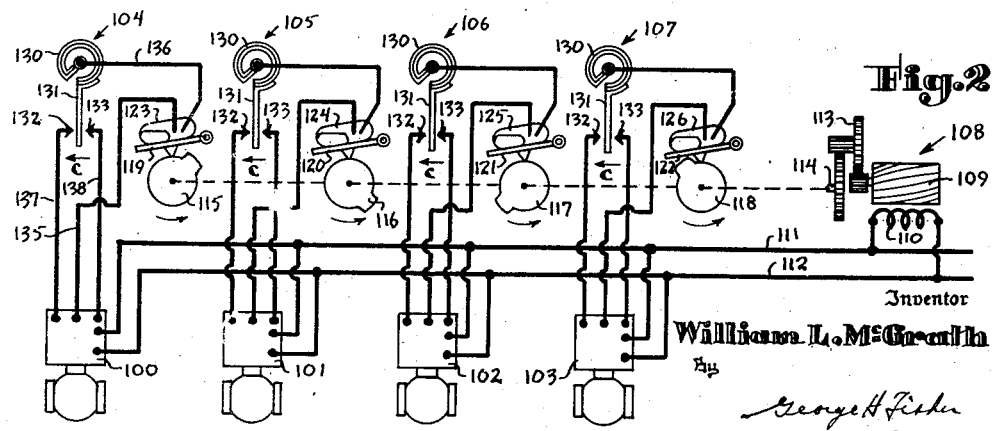

Referring now to Figure 2, a different control arrangement is utilized for obtaining substantially the same sequence of operation as is obtained in Figure 1. The control system of Figure 2 is shown to be applied to a building having four zones. Motorized zone valves 100, 101, 102, and 103 are utilized for controlling the supply of temperature changing fluid, such as steam, to their associated zones. These motorized valves may be of the two position type having a maintaining switch for moving the valves to their extreme positions and for maintaining the valves in the extreme positions until they are started to the other extreme positions. These valves may take the form shown and described in application Serial No. 15,965 filed by Carl G. Kronmiller on April 12, 1935.

The zone valves 100, 101, 102, and 103 are controlled by zone temperature responsive controllers in the form of zone thermostats 104, 105, 106, and 107, respectively. The zone valves are also controlled by a timer generally designated at 108 which may comprise a rotor 109 influenced by a field winding 110 connected across line wires 111 and 112. The rotor 109 operates a shaft 114 through a reduction gear train 113, the shaft carrying cams 115, 116, 117, and 118. The cams 115, 116, 117, and 118 operate pivoted levers 119, 120, 121, and 122, respectively, which in turn operate mercury switches 123, 124, 125, and 126. When the high dwells of the cams operate the levers, the switches are tilted to a position to cause bridging of the electrodes therein. For purposes of illustration, it is assumed that the shaft 114 and hence the cams are rotated once every eight minutes and that the cams 115, 116, 117, and 118 are spaced equi-distant. Hence each switch is moved to a closed position every eight minutes and the closing movements of the switches are staggered at two minute intervals.

Each of the zone thermostats may comprise a thermostatic element 130 for operating a switch arm 131 with respect to stationary contacts 132 and 133. When the space temperature decreases, say to 70°, the switch arm 131 is moved into engagement with the contact 132 and when the space temperature increases to 72°, the switch arm 131 is moved into engagement with the contact 133. The zone valves 100, 101, 102, and 103 receive power from the line wires 111 and 112 by being connected in parallel across the line wires.

Assume now that the temperature of the zone controlled by zone valve 100 decreases to 70° whereupon the switch arm 131 of the zone thermostat 104 engages the contact 132. When the switch 123 is operated by the cam 115 to bridge the electrodes therein, a circuit is completed from the motor 100 through wire 135, electrodes of the switch 123, wire 136, thermostatic element 130, switch arm 131, contact 132, and wire 137 back to the motorized valve 100. Completion of this circuit starts the motorized valve 100 towards an open position and the opening movement of the motorized valve is continued to the open position by means of a maintaining switch contained therein. Accordingly, upon a call for heat by the zone thermostat 104, the zone valve 100 is opened when the switch 123 is moved to a closed position. Since it is only possible to open the zone valve when the switch 123 is closed, the zone valve 100 may be opened only at predetermined intervals. The same is true for the other zone valves 101, 102, and 103, and since the operations of the switches 123, 124, 125, and 126 are staggered as set forth above, the opening movements of the various zone valves must necessarily be staggered. This effectively prevents the simultaneous opening of the various zone valves and therefore prevents wide fluctuations in the demand for steam caused by simultaneous opening of the zone valves.

When the temperature of the zone controlled by zone valve 100 increases to 72°, the switch arm 131 of the zone thermostat 104 moves into engagement with the contact 133. When the mercury switch 123 is tilted by the cam 115 to bridge the electrodes therein, a circuit is completed from the motorized valve 100, through wire 135, electrodes of the mercury switch 123, wire 136, thermostatic element 130, switch arm 131, contact 133, and wire 138 back to the motorized valve 100. Completion of this circuit starts the zone valve towards a closed position and the closing movement is continued to the closed position by the maintaining switch contained in the zone valve. Hence when the zone temperature is satisfied, the zone valve is moved to a closed position when the mercury switch 123 is closed. Such is the case for the other zone valves and since the operation of the switches 123, 124, 125, and 126 is staggered, the valves 100, 101, 102, and 103 are staggered in their closing movements.

Summarizing briefly the operation of Figure 2, it is seen that the zone valves can only be opened at predetermined time intervals providing their temperature responsive controllers are calling for a temperature change and that the zone valves can be closed only at predetermined time intervals providing their respective temperature responsive controllers are satisfied. Accordingly, large fluctuations in the demand for temperature changing fluid caused by simultaneous opening or closing of the zone valves is eliminated and desired temperature conditions are at all times maintained in each zone. It is also seen that the modification shown by Figure 2 provides for substantially the same sequence of operation as is obtained by that of Figure 1.

Figure 3:
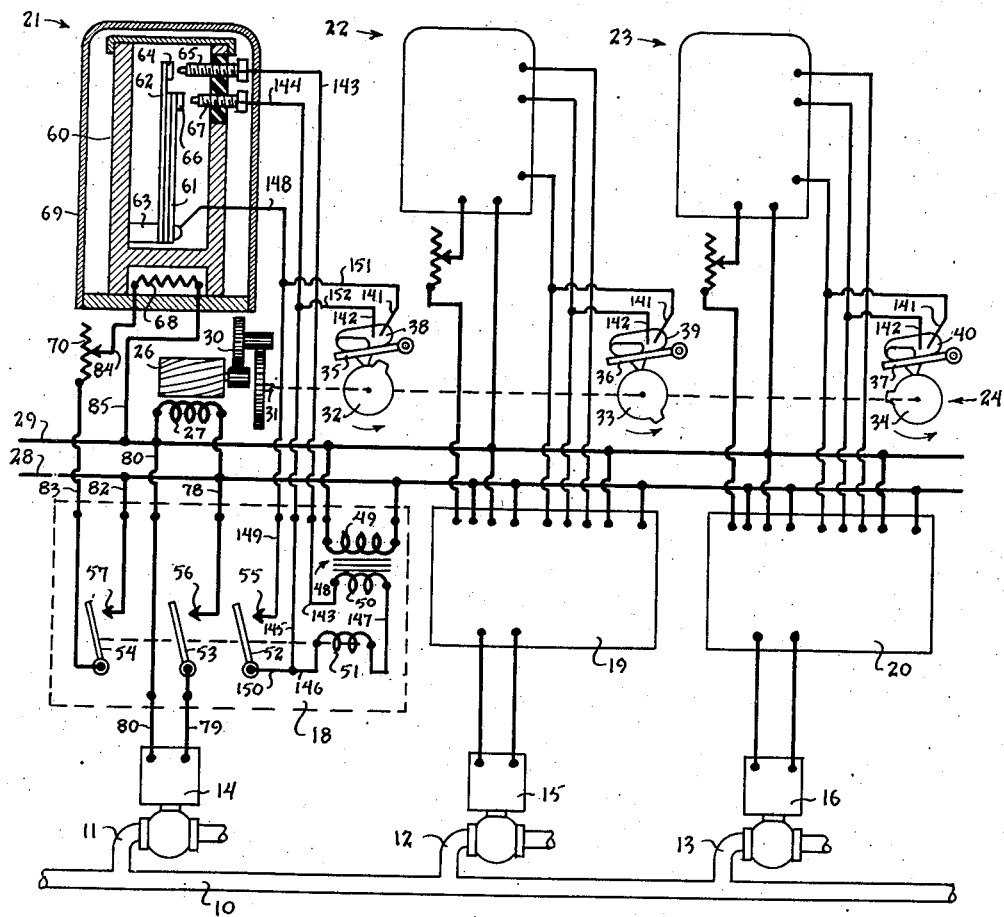
Figure 3 shows a modified form for accomplishing a slightly different sequence of operation.

Figure 3 as far as structure is concerned is substantially the same as Figure 1, and therefore like reference characters for like parts have been utilized. Figure 3, however, differs from Figure 1 in the construction of the switches 38, 39, and 40 and the electrical connections between the relays 18, 19, and 20, the switches 38, 39, and 40 and the outdoor controllers 21, 22, and 23. These differences in connections give a slightly different sequence of operation.

Switches 38, 39, and 40 are provided with two electrodes 141 and 142 which are bridged momentarily at predetermined time intervals. If, as in Figure 1, the cams 32, 33, and 34 make one revolution every nine minutes, the switches 38, 39, and 40 are momentarily closed every nine minutes and the closing movements of these switches are staggered by three minutes.

Assume now that the temperature of the outdoor controller 21 of Figure 3 decreases to 66°, whereupon contact 64 engages contact 65 and contact 66 engages contact 67. A starting circuit for the operating coil 51 of the relay 18 is completed. This starting circuit may be traced from the secondary 50, through wire 143, contacts 65, 64, 66, and 67, wires 144, 145, and 146, operating coil 51, and wire 147 back to the secondary 50. Completion of this circuit energizes the operating coil 51 to move the switch arms 52, 53, and 54 into engagement with their respective contacts 55, 56, and 57. Movement of the switch arm 53 into engagement with the contact 56 opens the zone valve 14 and movement of the switch arm 54 into engagement with the contact 57 energizes the heater element 68. Since this starting circuit for the operating coil 51 is independent of the switch 38, the outdoor controller 21 may at any time open its associated zone valve and energize its heater element 68 when the temperature thereof decreases to 66°.

Movement of the switch arm 52 into engagement with its contact 55 completes a maintaining circuit for the operating coil 51 which may be traced from the secondary 50 through wire 143, contacts 65 and 64, spring member 62, thermostatic element 61, wires 148 and 149, contact 55, switch arm 52, wires 150 and 146, operating coil 51, and wire 147 back to the secondary 50. Completion of this maintaining circuit maintains the relay 18 energized until the temperature of the outdoor controller 21 rises to 70° to separate the contacts 64 and 65. Accordingly, the relay 18 remains energized until the demand for heat by the outdoor controller is satisfied.

The switch 38 provides a timed auxiliary starting circuit for the relay to pull in the relay 18 whenever the contacts 64 and 65 of the outdoor controller are in engagement. Assume now that the temperature of the outdoor controller 21 is below 70° so that the contacts 64 and 65 are in engagement and that the switch 38 is moved to a position wherein the electrodes 141 and 142 are bridged. The timed auxiliary starting circuit completed thereby may be traced from the secondary 50, through wire 143, contacts 65 and 64, spring member 62, thermostatic element 61, wires 148 and 151, electrodes 141 and 142, wires 152, 145, and 146, operating coil 51, and wire 147 back to the secondary 50. Accordingly, if the outdoor controller 21 is not satisfied which causes the contacts 64 and 65 to be engaged, the time operated switch 38 may pull in the relay 18 to supply heat to the zone and to the outdoor controller and this supply of heat will be continued until such time as the outdoor controller becomes satisfied whereupon the contacts 64 and 65 disengage. The tendency of this system is therefore to pull in the relay 18 and supply heat to the building and to the outdoor controller at predetermined time intervals and to maintain the supply of heat to the zone and to the outdoor controller until the outdoor controller becomes satisfied. Since the operations of the switches 38, 39, and 40 are staggered, the timed opening of the zone valves 14, 15, and 16 are staggered to prevent fluctuations in the demand for steam caused by the simultaneous opening of the zone valves. The outdoor controllers 21, 22, and 23 can open their respective zone valves if the temperature therein should decrease to 66° regardless of the position of the timer 24 to take care of sudden changes in heating load.

Summarizing briefly the operation of Figure 3, it is seen that normally the zone valves are opened at predetermined time intervals by the timer and remain open until their associated temperature responsive controllers are satisfied. Since the opening movements of the zone valves are staggered, large fluctuations in demand for temperature changing fluid caused by simultaneous opening of the zone valves is eliminated and desired temperature conditions are at all times maintained in each zone. The staggered opening of the zone valves also tends to make the closing movements thereof staggered. Further, it is seen that the various temperature responsive controllers may open their associated zone valves independently of the timer if an abnormal load condition should occur which may be caused by a morning pick-up period or a sudden change in heating load.

Figure 4:
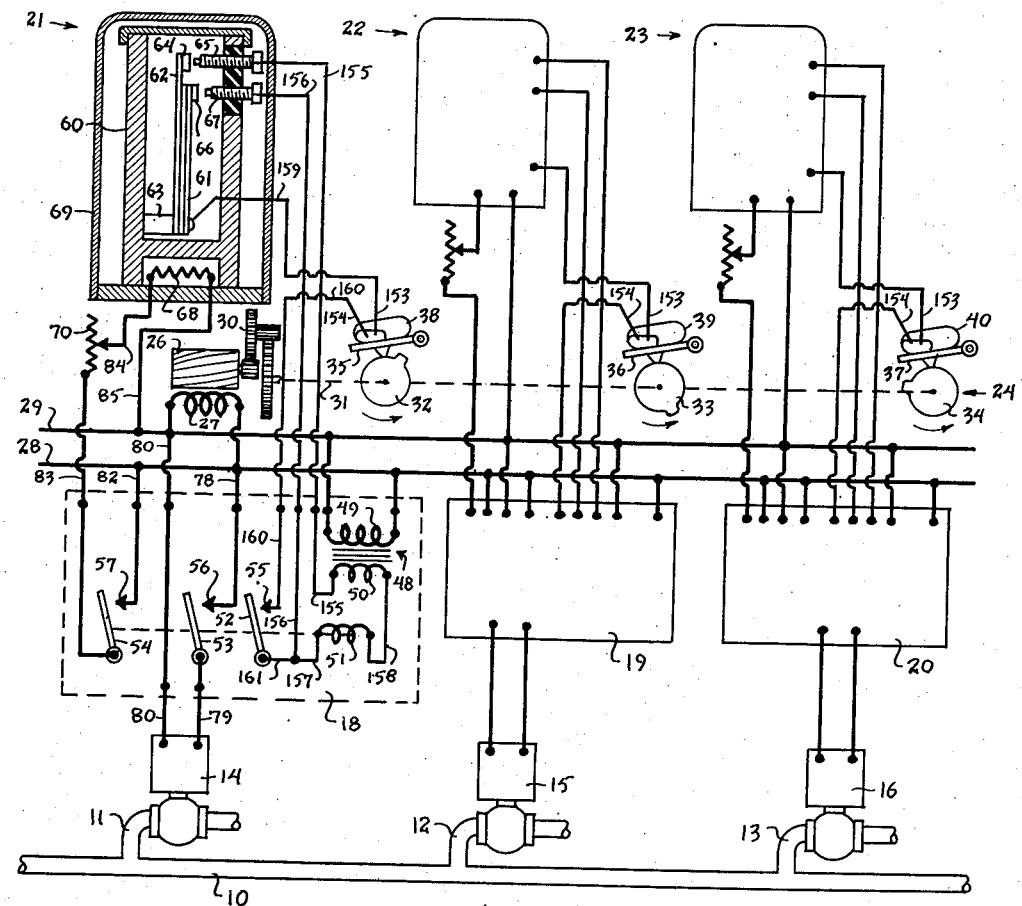
Figure 4 shows a further modification for obtaining still another sequence of control.

The construction shown in Figure 4 is substantially the same as that shown in Figures 1 and 3 and like references for like parts have been utilized in these three figures. Figure 4 differs from Figures 1 and 3 in the construction of the switches 38, 39, and 40 and in the wiring connections between the relays 18, 19, and 20, the switches 38, 39, and 40 and the outdoor controllers 21, 22, and 23. The switches 38, 39, and 40 are shown to include two electrodes 153 and 154 which are normally bridged and which are normally unbridged at predetermined time intervals. The time sequence of the timer 24 of Figure 4 may be the same as that of Figures 1 and 3.

Assume now that the temperature of the outdoor controller 21 of Figure 4 decreases to 66° to cause engagement of contacts 64 and 65 and contacts 66 and 67. A starting circuit for the operating coil 51 of the relay 18 is thereupon completed and may be traced from the secondary 50 through wire 155, contacts 65, 64, 66, and 67, wires 156 and 157, operating coil 51, and wire 158 back to the secondary 50. Completion of this circuit energizes the operating coil 51 to move the switch arms 52, 53, and 54 into engagement with their respective contacts 55, 56, and 57. Movement of the switch arms 53 and 54 into engagement with the contacts 56 and 57 opens the zone valve 14 and energizes the heater element 68 to supply heat to the zone and to the outdoor controller 21.

Movement of the switch arm 52 into engagement with the contact 55 completes a maintaining circuit for the operating coil 51 which may be traced from the secondary 50 through wire 155, contacts 65 and 64, spring member 62, thermostatic element 61, wire 159, electrodes 153 and 154 of the mercury switch 38, wire 160, contact 55, switch arm 52, wires 161 and 157, operating coil 51, and wire 158 back to the secondary 50. The completion of this circuit maintains the relay 51 energized until such time as the outdoor controller 21 rises in temperature to 70° to separate the contacts 64 and 65 or until the mercury switch 38 is tilted to unbridge the electrodes 153 and 154. Switch 38 normally interrupts the maintaining circuit to shut down the zone valve 14 and to interrupt the supply of heat to the outdoor controller 21 at predetermined time intervals and since the switches 38, 39, and 40 are staggered in operation the closing of the zone valves 14, 15, and 16 are staggered to prevent large fluctuations in the demand for steam caused by simultaneous closing of the zone valves. The zone valves 14, 15, and 16 may be closed by their associated outdoor controllers 21, 22, and 23 when the temperature thereof rises to 70° regardless of the position of the timer 24.

Summarizing briefly the operation of Figure 4, it is seen that the zone valves are opened upon a call for temperature change by their respective temperature responsive controllers and that the zone valves are normally closed in sequence by the timer. Accordingly, large fluctuations in the demand for temperature changing fluid caused by simultaneous closing of the zone valves is eliminated and desired temperature conditions are at all times maintained in each zone. Since the closing movements of the zone valves are staggered, the opening movements thereof also tend to be staggered so that fluctuations in the demand for temperature changing fluid caused by simultaneous opening of the zone valves is substantially eliminated also.

Figure 5:
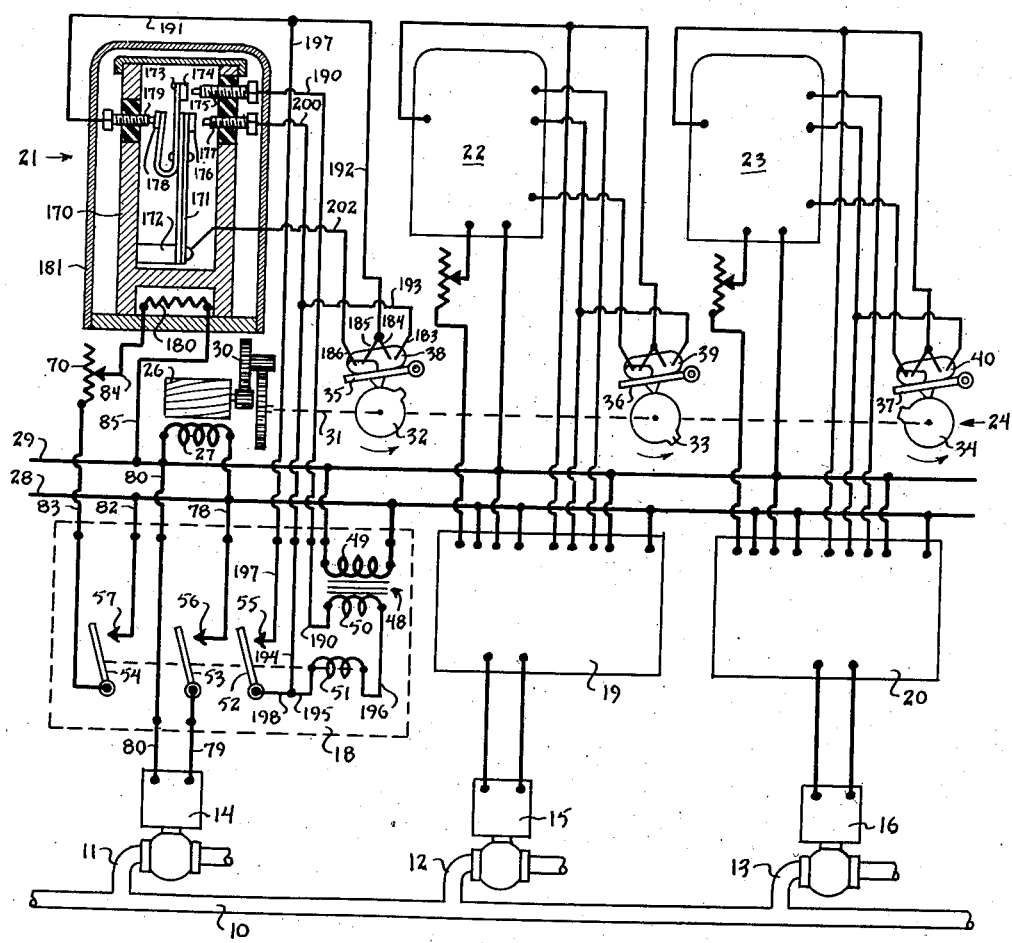
Figure 5 shows a modification which in effect combines the principles of Figures 3 and 4 into a composite control system.

It is found that the control system set forth in Figure 3 works exceptionally well during mild weather and that the control system of Figure 4 works exceptionally well during severe weather. The control system of Figure 5 combines the systems of Figures 3 and 4 into a composite structure to provide an improved sequence of operation regardless of whether the weather be mild or severe. In Figure 5, during mild weather the system thereof operates substantially the same as that of Figure 3 and it operates substantially the same as that of Figure 4 in severe weather.

Referring now to Figure 5, the structure disclosed therein is substantially the same as that of Figures 1, 3, and 4 and therefore like reference characters have been utilized for like parts. The outdoor controllers 21, 22, and 23 of Figure 5 differ somewhat from those of Figures 1, 3, and 4. In Figure 5, the outdoor controller 21 is shown to comprise a metallic block 170 hollowed out to receive a thermostatic element 171 mounted on a post 172. Secured to the bimetallic element 171 is a substantially U shaped spring member 173. The spring member 173 carries a contact 174 adapted to engage an adjustable stationary contact 175 and the bimetallic element 171 carries a contact 176 adapted to engage an adjustable stationary contact 177. Spring member 173 also carries a contact 178 adapted to engage an adjustable stationary contact 179. Upon a decrease in temperature, the contact 174 first engages the contact 175 at 70°, the contact 178 then disengages the contact 179 at 68°, and the contact 176 then engages the contact 177 at 66°. Upon an increase in temperature in the outdoor controller 21, contacts 176 and 177 separate at 66°, contacts 178 and 179 engage at 68°, and contacts 174 and 175 disengage at 70°. A heater element 180 supplies heat to the outdoor controller 21 and located in series with the heater element 189 is an adjustable rheostat 70 for adjusting the amount of heat given off by the heater element 180. A suitable casing 181 protects the outdoor controller from the elements.

The mercury switches 38, 39, and 40 operated by the timer 24 include electrodes 183, 184, 185, and 186. When the switches are in the positions shown in Figure 5, electrodes 185 and 186 are bridged, and when the switches are tilted to the opposite position electrodes 183 and 184 are momentarily bridged. The timing sequence of the switches 38, 39, and 40 may be the same as that of Figures 1, 3, and 4, so that the desired staggered operation may be obtained.

When the outdoor temperature is mild, the temperature of the outdoor controller will tend to be higher than when the outdoor temperature is severe. Accordingly, during mild weather the contacts 174 and 175 of the outdoor controller 21 provide the primary control, while during severe weather the contacts 176 and 177 provide the primary control.

Assume now that the outdoor temperature is relatively mild and that the temperature of the outdoor controller assumes a value between 68° and 70°, whereupon the contacts 174 and 175 and the contacts 178 and 179 are in engagement. When the mercury switch 38 is tilted to a position to bridge the electrodes 183 and 184, a starting circuit for the operating coil 51 is completed and may be traced from the secondary 50 through wire 190, contacts 175 and 174, spring member 173, contacts 178 and 179, wires 191 and 192, electrodes 184 and 183, wires 193, 194, and 195, operating coil 51, and wire 196 back to the secondary 50. Completion of this starting circuit energizes the operating coil 51 to move the switch arms 52, 53, and 54 into engagement with contacts 55, 56, and 57. Movement of the switch arms 53 and 54 into engagement with contacts 56 and 57 opens the zone valve 14 to supply heat to the zone and energizes the heater element 180 to supply heat to the outdoor controller 21.

Movement of the switch arm 52 into engagement with contact 55 completes a maintaining circuit for the operating coil 51 which is independent of the electrodes 183 and 184 of the switch 38, which circuit may be traced from the secondary 50 through wire 190, contacts 175 and 174, spring member 173, contacts 178 and 179, wires 191 and 197, contact 55, switch arm 52, wires 198 and 195, operating coil 51, and wire 196 back to the secondary 50. Completion of this circuit maintains the operating coil 51 energized until such time as the temperature of the outdoor controller 21 rises above 70° to separate contacts 174 and 175.

Accordingly, during mild weather, the relay 18 is pulled in to supply heat to the zone and to the outdoor controller at predetermined time intervals providing the outdoor controller is not satisfied and is maintained in until the outdoor controller 21 becomes satisfied. Since the switches 38, 39, and 40 are sequentially operated, the openings of the zone valves during mild weather are staggered to eliminate large fluctuations in demand for temperature changing fluid caused by simultaneous opening of the zone valves. Since the opening movements of the zone valves are thus staggered, the closing movements of the same will also tend to be staggered whereby fluctuations in the demand for temperature changing fluid caused by simultaneous closing of the valves is substantially eliminated.

Assume now that the weather conditions are severe, whereupon the outdoor temperature controller will assume lower temperature values. When the temperature of the outdoor controller 21 decreases to 66°, the contacts 174 and 175 and the contacts 176 and 177 are engaged to complete a starting circuit for the operating coil 51 which may be traced from the secondary 50 through wire 190, contacts 175, 174, 176, and 177, wires 200, 194, and 195, operating coil 51, and wire 196 back to the secondary 50. Completion of this circuit energizes the operating coil 51 to move the switch arms 52, 53, and 54 into engagement with the contacts 55, 56, and 57. Movement of the switch arms 53 and 54 into engagement with the contacts 56 and 57 opens the zone valve 14 to supply heat to the zone and energizes the heater element 180 to supply heat to the outdoor controller 21.

Movement of the switch arm 52 into engagement with the contact 55 completes a maintaining circuit for the operating coil 51 which may be traced from the secondary 50 through wire 190, contacts 175 and 174, spring member 173, bimetallic element 171, wire 202, electrodes 186 and 185, wires 192 and 197, contact 55, switch arm 52, wires 198 and 195, operating coil 51, and wire 196 back to the secondary 50. Completion of this circuit maintains the operating coil 51 energized until the mercury switch 38 is tilted to a position to unbridge the electrodes 185 and 186, it being understood that the contacts 174 and 175 are normally engaged during severe weather.

Since the switches 38, 39, and 40 are sequentially operated, the opening movements of the zone valves 14, 15, and 16 are staggered during severe weather to prevent large fluctuations in the demand for temperature changing fluid caused by simultaneous closing of the zone valves. Since the closing movements of the zone valves are staggered during severe weather, the opening movements thereof will also tend to be staggered, whereupon fluctuations in the demand for temperature changing fluid caused by simultaneous opening of the zone valves is substantially eliminated. The outdoor controller may close off the zone valves when the temperature thereof increased to 70° to separate the contacts 174 and 175.

The operation of Figure 5 may be summarized briefly as follows: in mild weather the zone valves are opened at predetermined time intervals providing their temperature responsive controllers are not satisfied and remain open until their associated temperature responsive controllers are satisfied. The sequential opening of the zone valves during mild weather also tends to cause sequential closing thereof, and accordingly large fluctuations in the demand for temperature changing fluid caused by simultaneous opening or closing of the zone valves is eliminated. In severe weather, the temperature responsive controllers open their associated zone valves upon a call for temperature change and the zone valves are closed at predetermined time intervals which also tend to open the zone valves at predetermined time intervals. Accordingly, during severe weather large fluctuations in the demand for temperature changing fluid caused by simultaneous opening or closing of the zone valves is eliminated. In both instances, desired temperatures are maintained in each zone at all times.

From the above it is seen that this invention contemplates a temperature control system for a building having a plurality of zones wherein the zone valves are controlled by temperature responsive controllers to maintain desired temperatures in each zone and wherein timing means are provided for staggering the opening and closing movements of the zone valves to eliminate large fluctuations in the demand for temperature changing fluid caused by simultaneous opening or closing of a plurality of zone valves. In several of the modifications of this invention, outdoor controllers have been described for controlling the temperature in the various zones but it is within the contemplation of this invention to substitute zone thermostats therefor as was done in Figure 2. Also, this invention is applicable to cooling systems as well as heating systems and the control of a cooling system by the control systems defined herein is also within the contemplation of this invention. The control systems of this invention may also be utilized for purposes other than controlling temperature conditions in zones of a building and such uses are also within the contemplation of this invention.

Although for purposes of illustration, several forms of this invention have been disclosed, other forms thereof may become apparent to those skilled in the art upon references to this disclosure and therefore this invention is to be limited only by the scope of the appended claims and prior art.

I claim as my invention:

1. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, electrical means for opening and closing the valve means including an operating coil and a maintaining switch which is closed when the valve means is opened, thermostatic means for each zone and including a pair of switches sequentially closed upon a temperature change in one direction, electrical connections for each zone between the second to close switch and the operating coil for opening the valve means of that zone and electrical connections for each zone between the first to close switch, the maintaining switch and the operating coil to maintain the valve means of that zone open until the first to close switch opens, normally open time operated switching means associated with each zone and sequentially closed with respect to the various zones, and means for including the normally open time operated switching means in the first mentioned electrical connections to allow opening of the valve means only at predetermined time intervals, whereby the opening of the valve means of the various zones are staggered and desired temperatures is maintained in each zone.

2. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, electrical means for opening and closing the valve means including an operating coil and a maintaining switch which is closed when the valve means is opened, thermostatic means for each zone and including a pair of switches sequentially closed upon a temperature change in one direction, electrical connections for each zone between the second to close switch and the operating coil for opening the valve means of that zone and electrical connections for each zone between the first to close switch, the maintaining switch and the operating coil to maintain the valve means of that zone open until the first to close switch opens, normally closed time operated switching means associated with each zone and sequentially opened with respect to the various zones, and electrical connections for each zone between the normally closed time operated switching means, the maintaining switch and the operating coil to maintain the valve means open until the normally closed time operated switching means opens, whereby the closing of the valve means of the various zones is staggered and desired temperatures are maintained in each zone.

3. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, electrical means for opening and closing the valve means including an operating coil and a maintaining switch which is closed when the valve means is opened, thermostatic means for each zone and including a pair of switches sequentially closed upon a temperature change in one direction, electrical connections for each zone between the second to close switch and the operating coil for opening the valve means of that zone and electrical connections for each zone between the first to close switch, the maintaining switch and the operating coil to maintain the valve means of that zone open until the first to close switch opens, normally open time operated switching means associated with each zone and sequentially closed with respect to the various zones, means for including the normally open time operated switching means in the first mentioned electrical connections to allow opening of the valve means only at predetermined time intervals, whereby the opening of the valve means of the various zones is staggered and desired temperatures are maintained in each zone, normally closed time operated switching means associated with each zone and sequentially opened with respect to the various zones, and electrical connections for each zone between the normally closed time operated switching means, the maintaining switch and the operating coil to maintain the valve means open until the normally closed time operated switching means opens, whereby the closing of the valve means of the various zones is staggered and desired temperatures are maintained in each zone.

4. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, electrical means for opening and closing the valve means including an operating coil and a maintaining switch which is closed when the valve means is opened, thermostatic means for each zone and including a pair of switches sequentially closed upon a temperature change in one direction, electrical connections for each zone between the second to close switch and the operating coil for opening the valve means of that zone and electrical connections for each zone between the first to close switch, the maintaining switch and the operating coil to maintain the valve means of that zone open until the first to close switch opens, normally open time operated switching means associated with each zone and sequentially closed with respect to the various zones, and electrical connections for each zone between the first to close switch, the normally open time operated switch and the operating coil for opening the valve means at predetermined time intervals when the first to close switch is closed, whereby the opening of the valve means is staggered and desired temperatures are maintained in each zone.

5. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, electrical means for opening and closing the valve means including an operating coil and a maintaining switch which is closed when the valve means is opened, thermostatic means for each zone and including a pair of switches sequentially closed upon a temperature change in one direction, electrical connections for each zone between the second to close switch and the operating coil for opening the valve means of that zone and electrical connections for each zone between the first to close switch, the maintaining switch and the operating coil to maintain the valve means of that zone open until the first to close switch opens, normally closed time operated switching means associated with each zone and sequentially operated with respect to the various zones, and means for including the normally closed time operated switching means in the last mentioned electrical connections for closing the valve means at predetermined intervals if the second to close switch is not closed, whereby the closing of the valve means is staggered and desired temperatures are maintained in each zone.

6. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, electrical means for opening and closing the valve means including an operating coil and a maintaining switch which is closed when the valve means is opened, thermostatic means for each zone and including a pair of switches sequentially closed upon a temperature change in one direction, electrical connections for each zone between the second to close switch and the operating coil for opening the valve means of that zone and electrical connections for each zone between the first to close switch, the maintaining switch and the operating coil to maintain the valve means of that zone open until the first to close switch opens, normally open time operated switching means associated with each zone and sequentially closed with respect to the various zones, electrical connections for each zone between the first to close switch, the normally open time operated switch and the operating coil for opening the valve means at predetermined time intervals when the first to close switch is closed, whereby the opening of the valve means is staggered and desired temperatures are maintained in each zone, normally closed time operated switching means associated with each zone and sequentially operated with respect to the various zones, and means for including the normally closed time operated switching means in the last mentioned electrical connections for opening the valve means at predetermined intervals if the second to close switch is not closed, whereby the opening of the valve means is staggered and desired temperatures are maintained in each zone.

7. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, electrical means for opening and closing the valve means including an operating coil and a maintaining switch which is closed when the valve means is opened, thermostatic means for each zone and including a pair of switches sequentially closed upon a temperature change in one direction, electrical connections for each zone between the second to close switch and the operating coil for opening the valve means of that zone and electrical connections for each zone between the first to close switch, the maintaining switch and the operating coil to maintain the valve means of that zone open until the first to close switch opens, and time controlled means associated with said electrical connections in a manner to control only the time in which movements of the various valve means take place under the control of their corresponding thermostatic means, said time controlled means serving to stagger movements ir the same direction of said valve means.

8. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, two stage thermostatic means for each zone, each thermostatic means controlling its valve means in a manner to open it when the temperature at the thermostatic means varies in one direction to the second stage setting thereof and to close said valve means when the temperature varies in the opposite direction from the first stage setting of the thermostatic means, control means associated with each thermostatic means for closing the corresponding valve means independently of the first stage of the thermostatic means but dependently of the second stage of the thermostatic means, and time controlled means for sequentially actuating said control means for thereby closing at spaced intervals only the valve means controlled by the thermostatic means which are on their first stage.

9. In a control system for a temperature changing system conditioning a plurality of zones and having a source of temperature changing fluid and means for supplying temperature changing fluid to the various zones, the combination of, valve means for each zone for controlling the supply of temperature changing fluid to its associated zone, thermostatic means for each zone for controlling corresponding valve means, each thermostatic means being constructed and arranged to open its corresponding valve means at any time upon demand for temperature changing medium and to close it when the thermostatic means is satisfied, first control means associated with each valve means and capable of closing it before the corresponding thermostatic means is completely satisfied, each first control means being incapable of preventing opening of its valve means by the corresponding thermostatic means, second control means associated with each valve means and capable of causing opening thereof even when the corresponding thermostatic means is not demanding such opening movement provided that the corresponding thermostatic means is not completely satisfied, and time controlled means for operating said first and second control means in a manner to stagger opening and closing movements of said valve means.

10. In a control system for a temperature changing system conditioning a plurality of zones, a source of heating fluid and means for supplying heating fluid to the various zones, the combination of, electrically operated valve means for each zone for controlling the supply of heating fluid to its associated zones, an outdoor controller for each zone having electrical heating means and thermostatically operated switching means, means including electrical connections between the thermostatically operated switching means, the electrical heating means and the electrically operated valve means for each zone for opening and closing the electrically operated valve means and for simultaneously energizing and deenergizing the electrical heating means to maintain desired temperatures in each zone, and time controlled switching means associated with the electrical connections of each zone for controlling movements of the zone valve means and also controlling the electrical heating means for said outdoor controllers, said time controlled switching means being connected into said connections in a manner to control only the times at which movements of the valve means and changes in energization of the electrical heating means take place under the control of the corresponding thermostatic switching means and serving to stagger opening and closing movements of the various valve means.

11. In a control system for temperature changing system conditioning a plurality of zones having a source of temperature changing fluid and means for supplying said fluid to the various zones, the combination of, a plurality of two position valve means, one for each zone for controlling the supply of temperature changing fluid to its associated zone, a zone thermostatic means for each valve means, a secondary control means for each zone, means for operating said secondary control means in sequence, and connections for each zone interconnecting the valve means, thermostatic means and secondary control means in such manner that both the thermostatic means and the secondary control means must be demanding movement of the valve means to a first position to bring about movement of the valve means to such position, the valve means thereafter remaining in its first position irrespective of the action of said secondary control means and until such time as the thermostatic means demands movement of the valve means to its second position.

12. In a control system for a temperature changing system conditioning a plurality of zones having a source of temperature changing fluid and means for supplying said fluid to the various zones, the combination of, a plurality of two position valve means, one for each zone for controlling the supply of temperature changing fluid to its associated zone, a zone thermostatic means for each valve means, a secondary control means for each zone, means for operating said secondary control means in sequence, and connections for each zone interconnecting the valve means, thermostatic means and secondary control means in such manner that both the thermostatic means and the secondary control means must be demanding movement of the valve means to open position to bring about opening movement of the valve means, the valve means thereafter remaining in its open position irrespective of the action of said secondary control means and until such time as the thermostatic means demands movement of the valve means to its closed position.

13. In a control system for a temperature changing system conditioning a plurality of zones having a source of temperature changing fluid and means for supplying said fluid to the various zones, the combination of, a plurality of two position valve means, one for each zone for controlling the supply of temperature changing fluid to its associated zone, a zone thermostatic means for each valve means, a secondary control means for each zone, means for operating said secondary control means in sequence, and connections for each zone interconnecting the valve means, thermostatic means and secondary control means in such manner that both the thermostatic means and the secondary control means must be demanding movement of the valve means to closed position to bring about closing movement of the valve means, the valve means thereafter remaining in its closed position irrespective of the action of said secondary control means and until such time as the thermostatic means demands movement of the valve means to its open position.

14. In a control system for a temperature changing system conditioning a plurality of zones having a source of temperature changing fluid and means for supplying said fluid to the various zones, the combination of, a plurality of two position valve means, one for each zone for controlling the supply of temperature changing fluid to its associated zone, a thermostatic means for each zone, each thermostatic means having at least three operating positions including a valve means opening position, a valve means closing position, and an intermediate position, connections between each valve means and its associated thermostatic means by which the thermostatic means opens and closes its valve means when the thermostatic means respectively moves to its valve opening and valve closing positions, a secondary control means for each zone, means to operate all of said secondary control means in sequence, and connections between each valve means, thermostatic means and secondary control means by which the secondary control means is enabled to move said valve means to one of its positions only when the thermostatic means is in its intermediate position.

15. In a control system for a temperature changing system conditioning a plurality of zones having a source of temperature changing fluid and means for supplying said fluid to the various zones, the combination of, a plurality of two position valve means, one for each zone for controlling the supply of temperature changing fluid to its associated zone, a thermostatic means for each zone, each thermostatic means having at least three operating positions including a valve means opening position, a valve means closing position, and an intermediate position, connections between each valve means and its associated thermostatic means by which the thermostatic means opens and closes its valve means when the thermostatic means respectively moves to its valve opening and valve closing positions, a secondary control means for each zone, means to operate all of said secondary control means in sequence, and connections between each valve means, thermostatic means and secondary control means by which the secondary control means is enabled to move said valve means to its open position only when the thermostatic means is in its intermediate position.

16. In a control system for a temperature changing system conditioning a plurality of zones having a source of temperature changing fluid and means for supplying said fluid to the various zones, the combination of, a plurality of two position valve means, one for each zone for controlling the supply of temperature changing fluid to its associated zone, a thermostatic means for each zone, each thermostatic means having at least three operating positions including a valve means opening position, a valve means closing position, and an intermediate position, connections between each valve means and its associated thermostatic means by which the thermostatic means opens and closes its valve means when the thermostatic means respectively moves to its valve opening and valve closing position, a secondary control means for each zone, means to operate all of said secondary control means in sequence, and connections between each valve means, thermostatic means and secondary control means by which the secondary control means is enabled to move said valve means to its closed position only when the thermostatic means is in its intermediate position.

17. In a control system for a temperature changing system conditioning a plurality of zones having a source of temperature changing fluid and means for supplying said fluid to the various zones, the combination of, a plurality of two position valve means, one for each zone for controlling the supply of temperature changing fluid to its associated zone, a thermostatic means for each zone, each thermostatic means having at least three operating positions including a valve means closing position, opening position, a valve means closing position, and an intermediate position, connections between each valve means and its associated thermostatic means by which the thermostatic means opens and closes its valve means when the thermostatic means respectively moves to its valve opening and valve closing positions, a secondary control means for each zone, means to operate all of said secondary control means in sequence, and connections between each valve means, thermostatic means and secondary control means by which the secondary control means is enabled to move said valve means from open position to closed position and vice versa when the thermostatic means is in its intermediate position.

WILLIAM L. McGRATH.